(12) United States Patent
Xu et al.

(10) Patent No.: US 7,293,142 B1
(45) Date of Patent: Nov. 6, 2007

(54) MEMORY LEAK DETECTION SYSTEM AND METHOD USING CONTINGENCY ANALYSIS

(75) Inventors: Jun Xu, Cupertino, CA (US); Xiangrong Wang, Milpitas, CA (US); Christopher H. Pham, Milpitas, CA (US); Srinivas Goli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 403 days.

(21) Appl. No.: 10/827,048

(22) Filed: Apr. 19, 2004

(51) Int. Cl.
*G06F 12/00* (2006.01)
(52) U.S. Cl. .................. 711/124; 717/124; 707/206
(58) Field of Classification Search ............. 711/170; 717/124; 707/206
See application file for complete search history.

(56) References Cited

U.S. PATENT DOCUMENTS

| | | | |
|---|---|---|---|
| 5,590,329 A | 12/1996 | Goodnow, II et al. | 717/144 |
| 5,644,709 A * | 7/1997 | Austin | 714/53 |
| 5,689,707 A | 11/1997 | Donnelly | 707/206 |
| 5,842,019 A * | 11/1998 | Kolawa et al. | 717/130 |
| 5,911,073 A | 6/1999 | Mattson, Jr. et al. | 717/104 |
| 5,953,530 A | 9/1999 | Rishi et al. | 717/127 |
| 6,125,434 A * | 9/2000 | Willard et al. | 711/170 |
| 6,154,128 A | 11/2000 | Wookey et al. | 340/506 |
| 6,182,249 B1 | 1/2001 | Wookey et al. | 714/47 |
| 6,237,114 B1 | 5/2001 | Wookey et al. | 714/47 |
| 6,523,141 B1 * | 2/2003 | Cantrill | 714/48 |
| 6,560,773 B1 | 5/2003 | Alexander, III et al. | 717/128 |
| 6,658,652 B1 | 12/2003 | Alexander, III et al. | 717/128 |
| 2004/0221120 A1 * | 11/2004 | Abrashkevich et al. | 711/170 |

OTHER PUBLICATIONS

The Oxford Handbook of Memory, Chapter 4, Contingency Analyses of Memory, Author: Michael J. Kahana, Oxford University Press, 2000, pp. 59-72.
Cal Erickson, "Memory Leak Detection In Embedded Systems," Linux Journal, Sep. 1, 2002; 5 pages; http://www.linuxjournal.com.
Cal Erickson, "Memory Leak Detection in C++," Linux Journal, Jun. 1, 2003, 5 pages, http://www.linuxjournal.com.
Jun Xu, Xiangrong Wang, Christopher Pham, "Less Intrusive Memory Leak Detection Inside Kernel," (Fast Abstract ISSRE 2003); 14th IEEE International Symposium on Software Reliability Engineering (ISSRE 2003); Denver, Colorado; Nov. 17-20, 2003; Chillarege Press; Copyright 2003 (2 pages).
Xiangrong Wang, Jun Xu, Christopher H. Pham, "An Effective Method to Detect Software Memory Leakage Leveraged from Neuroscience Principles Governing Human Memory Behaivor," 15th International Symposium on Software Reliability Engineering (ISSRE 2004), Saint Malo, Bretagne, France, Nov. 2-5, 2004 (11 pages).

* cited by examiner

*Primary Examiner*—Woo H. Choi
(74) *Attorney, Agent, or Firm*—Campbell Stephenson LLP

(57) ABSTRACT

Systems, methods, apparatus and software can be implemented to detect memory leaks with relatively high confidence. By analyzing memory blocks stored in a memory, implicit and/or explicit contingency chains can be obtained. Analysis of these contingency chains identifies potential memory leaks, and subsequent verification confirms whether the potential memory leaks are memory leaks.

47 Claims, 6 Drawing Sheets

| Index | Content (Contingencies) |
|---|---|
| Block 0xABCD | null |
| Block 0x1234 | 0xABCD, 0xBCDE |
| Block 0x5678 | 0xABCD |
| Block 0xBCDE | root |
| Block 0x89AB | 0xBCDE |

MEMORY LEAK DETECTION SYSTEM AND METHOD USING CONTINGENCY ANALYSIS

FIELD OF THE INVENTION

The present invention relates to testing of hardware and software, and particularly to the detection and identification of memory leaks in software.

BACKGROUND OF THE INVENTION

In any computing system, including general purpose computer systems and embedded systems, resource management generally and memory management in particular are very important to proper system operation. In any computing system, memory management typically occurs at several levels, e.g., hardware memory management, operating system (OS) memory management, and application memory management. OS and application memory management rely on various software techniques for allocation and deallocation of memory used by the system. In the OS, memory is allocated to user programs, and reused by other programs when it is no longer required. Application memory management typically involves supplying the memory needed for a program's objects and data structures from the limited resources available, and recycling that memory for reuse when it is no longer required.

In general, as memory allocation techniques have become more sophisticated, the nature of memory allocation errors have become more complex. For example, with static allocation (used in many early systems and in languages such as Fortran) all data structure names are bound to storage locations at compile-time and the bindings do not change at run-time. Although static allocation imposes significant limits on program flexibility, it reduces the complexity associated with debugging memory allocation errors. Various forms of dynamic memory allocation, both for stack memory and heap memory are more commonly used today. However, to support dynamic allocation, OS's and application programs utilize additional code to handle their changing memory requirements because they cannot in general predict in advance how much memory they are going to require. For example, when a program requests a block of memory, a memory manager will allocate that block out of the larger blocks it has received from the operating system. This allocation is performed by some combination of OS or kernel level memory management software and memory management software associated with the application itself, e.g., allocation and dealllocation functions such as the C functions malloc ( ) and free ( ).

One common form of memory allocation error is a memory leak, which can be a major resource issue leading to many system malfunctions and negative performance impacts. In general, a memory leak occurs when allocated memory is not freed after use, or when a needed reference to that allocated memory, e.g., a pointer to the memory allocation, is deleted thereby rendering the memory no longer reachable or "live" to the system. Memory leaks can take many forms, e.g. occurring in contiguous block or fragmentally, and can occur in a variety of different memory systems such as flattened memory architectures or those with virtual memory spaces. Reckless use of dynamic memory allocation can lead to memory management problems, which cause performance degradation, unpredictable execution or crashes.

Various tools currently exist to detect memory leaks. These tools typically work by replacing generic memory functions in the library, such as malloc ( ) and free ( ), and other memory calls with specialized functions designed to track and account for memory allocation. Each tool typically has code that intercepts calls to traditional memory functions during program execution and sets up logging information for each memory allocation/de-allocation request. Some tools can further implement memory protection fences to catch illegal memory accesses. In still other examples, the policing of memory allocation and de-allocation is performed by specialized programs generally referred to as garbage collectors.

Unfortunately, all of these techniques used to analyze software memory require source code instrumentation adding to the size and complexity of the source code. Moreover, such code instrumentation typically degrades program performance. In some cases, e.g., embedded systems, the impact may be so significant that it makes the program unusable in its planned environment. In still other cases, leak detection programs are so large that they require a virtual memory image of the program being analyzed, which can make their use very difficult. Many of the tools also present numerous "false positives," that is they identify circumstances as memory leaks which are not in fact memory leaks.

Accordingly, it is desirable to have memory leak detection and analysis tools and methods that are compact, are less intrusive, pose low performance impact, are efficient, and present a low rate of false-positive results.

SUMMARY OF THE INVENTION

It has been discovered that systems, methods, apparatus and software can be implemented to detect memory leaks with relatively high confidence. By analyzing memory blocks stored in a memory, implicit and/or explicit contingency chains can be obtained. Analysis of these contingency chains identifies potential memory leaks, and subsequent verification confirms whether the potential memory leaks are memory leaks.

Accordingly, one aspect of the present invention provides a method. A first allocated memory block is selected from a plurality of allocated memory blocks. The first allocated memory block includes a first allocated memory block address. Other allocated memory blocks of the plurality of allocated memory blocks are searched for a reference to the first allocated memory block. It is verified that the first allocated memory block is a memory leak when the reference to the first allocated memory block is not found in the other allocated memory blocks of the plurality of allocated memory blocks. The first allocated memory block is reported as a memory leak.

In another aspect of the present invention, a system includes a memory, a processor coupled to the memory, and a memory leak detection system (MLDS) engine. At least a portion of the MLDS engine is encoded as instructions stored in the memory and executable on the processor. The MLDS engine is configured to: select a first allocated memory block from a plurality of allocated memory blocks stored in the memory, wherein the first allocated memory block includes a first allocated memory block address; search other allocated memory blocks of the plurality of allocated memory blocks for a reference to the first allocated memory block; verify that the first allocated memory block is a memory leak when the reference to the first allocated memory block is not found in the other allocated memory blocks of the plurality of allocated memory blocks; and report the first allocated memory block as a memory leak.

In another aspect of the present invention, a computer readable medium includes program instructions executable on a processor. The computer readable medium is at least one of an electronic storage medium, a magnetic storage medium, an optical storage medium, and a communications medium conveying signals encoding the instructions. The program instructions are operable to implement each of: selecting a first allocated memory block from a plurality of allocated memory blocks, wherein the first allocated memory block includes a first allocated memory block address; searching other allocated memory blocks of the plurality of allocated memory blocks for a reference to the first allocated memory block; verifying that the first allocated memory block is a memory leak when the reference to the first allocated memory block is not found in the other allocated memory blocks of the plurality of allocated memory blocks; and reporting the first allocated memory block as a memory leak.

Yet another aspect of the present invention provides an apparatus including: a means for selecting a first allocated memory block from a plurality of allocated memory blocks, wherein the first allocated memory block includes a first allocated memory block address; a means for searching other allocated memory blocks of the plurality of allocated memory blocks for a reference to the first allocated memory block; a means for verifying that the first allocated memory block is a memory leak when the reference to the first allocated memory block is not found in the other allocated memory blocks of the plurality of allocated memory blocks; and a means for reporting the first allocated memory block as a memory leak.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 1:
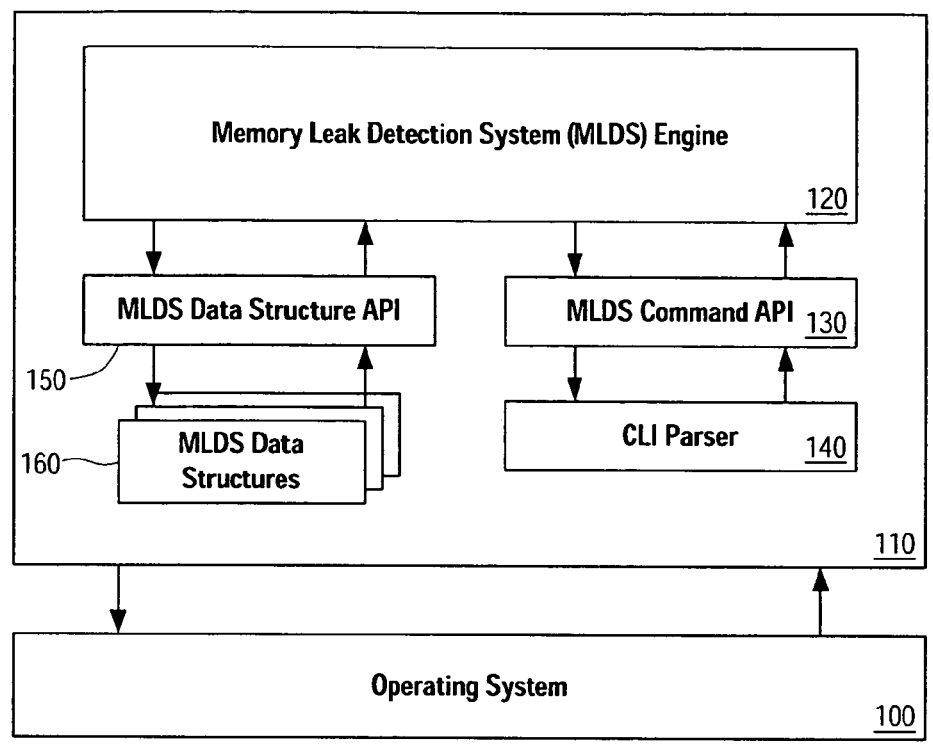
FIG. 1 is a simplified block diagram of a memory leak detection system.

The following sets forth a detailed description of at least the best contemplated mode for carrying out the one or more devices and/or processes described herein. The description is intended to be illustrative and should not be taken to be limiting.

Although there are a number of techniques for identifying potential memory leaks, existing memory leak detection algorithms do not adequately distinguish between actual memory leaks and other conditions. In order to both improve memory leak detection systems, both directly by improving the algorithms and indirectly by improving the manner in which the algorithms are adjusted or "fine-tuned", certain neuroscience concepts and principles have been applied to memory leak detection. In particular, the present application takes advantage of concepts described by Michael Kahana in "Contingency Analyses of Memory," pp. 59-72, *The Oxford Handbook of Memory*, Oxford University Press, 2000, which is hereby incorporated herein by reference in its entirety.

In general, the contingency analysis described by Kahana is used to assess the relationship between the results from different types of tests of human memory. One goal of the analysis is to determine if the memory mechanisms targeted by the different types of tests share certain features or are instead more likely to be unrelated. As demonstrated by Kahana, contingency analysis techniques can used to select among various memory tests to isolate those tests that are more likely targeting the same mechanism or mechanisms. In so doing, contingency analysis can lead to the selection, modification, and use of the testing techniques most suited for determining a particular memory related characteristic. Additionally, contingency analysis of human memory suggests certain types of tests to be performed when analyzing non-human memory.

For example, Kahana examines a number of tests of successive memory tasks including item recognition, cued recall, tests of episodic memory using identical cues, and tests of episodic memory using cues containing identical information. Kahana shows that successive tests of episodic memory with identical cues or cues containing identical information demonstrate very high dependencies using the Yule's Q measure of correlation (described below). Thus, by applying contingency analyses to the relationship between recognition and recall, researchers have shown that experimental variables that have a significant effect on overall levels of performance do not seem to affect the task-to-task contingencies. Although Kahana's analysis is aimed at gaining insight into human memory, similar principles can be applied to computer memory for both detecting possible memory leaks and assessing the level of confidence in a particular possible memory leak.

To illustrate the use of contingency analysis, Kahana describes examining the relationship between recognition and recall at the level of individual subject items. Subjects study pairs of items (A-B) and are then given two successive tests: an item recognition test followed by a cued recall test. In the recognition test, an experimenter present B items from the studied pairs intermixed with non-studied items (lures). Subjects judge each item as a target or a lure. In cued-recall tests, subjects attempt to recall the B items given the A items as cues. Because the results cannot be averaged over subjects or items, a contingency table is computed. The table below illustrates an example of such a contingency table:

|       | Test 1 |   |
|-------|--------|---|
| Test 2 | 1 | 0 |
| 1     | A | B |
| 0     | C | D |

Because the test outcomes are binary variables (1=yes, and 0=no), subject-item correlation can be computed between test 1 (e.g., the recognition test) and test 2 (e.g., the recall test) by tabulating the data in the contingency table. Each of the values A-D represents the tally of results for that category.

Yule's Q is a common measure of correlation for 2×2 contingency tables, and is calculated by evaluating $Q=(AD-BC)/(AD+BC)$. The value Q can range from −1 (perfect negative correlation) to +1 (perfect positive correlation). Thus, Yule's Q is used to study agreement among ratings of multiple statistical parameters, experts, diagnostic tests, etc. Intuitively, it shows the relative increase in the odds of one test leading to a certain result, given that the other test yielded the same result. The value is invariant regardless of whether one is concerned with positive or negative rating, or which test is the reference. While such analysis may not provide direct information about the underlying mechanisms tested by each test, it does provide some information about the probability that two test are testing related mechanisms, assuming that the mechanisms have the same effect on both tests. Although Yule's Q is the example illustrated here, one having ordinary skill in the art will readily recognize that a variety of different correlational measures can be used in contingency analysis.

To apply these techniques to the problem of memory leak detection, certain parallels should be identified. Kahana's analysis is based on using memory cues and the level of recognition and recall to determine, among other things, the likelihood that the two tests are testing for the same (or a similar) underlying mechanism. In the case of memory leak detection, two different tests can be employed to determine if a particular memory block represents a leak. Contingency analysis can be used to help determine: (1) which tests among all the possible tests are best suited to be used together, and (2) in some specific cases, a confidence level in the determination based on the two tests.

In the case of computer memories, there are many objects that can possibly have several associated dependencies. For example, if the object is a pointer to a memory block, the pointer has dependencies such as: other pointers/addresses, global variables that store the value of the pointer, etc. The dependencies collectively form the contingency, that is a dependency relationship, among objects.

In more specific examples, one can examine the manner in which memory is managed in a particular OS. In the present application, examples will emphasize use of Cisco IOS software. Many line cards, network switches, switch-routers, routers, router-switches and storage network devices produced by Cisco Systems, Inc., operate using Cisco IOS software. Cisco IOS software is system software that provides common functionality, scalability, and security for a variety of devices, and allows centralized, integrated, and automated installation and management of internetworks while ensuring support for a wide variety of protocols, media, services, and platforms. The IOS represents an operating system used by embedded systems, in contrast to operating systems like Unix, Linux, and Windows which are more commonly (although not exclusively) used in general purpose computer systems such as PCs, workstations, and servers. Thus, although many of the examples disclosed in this application emphasize embedded applications generally, and use in the IOS environment in particular, those of ordinary skill in the art will readily recognize that the systems, methods, and software described herein can generally be used with any type of computing system.

A variety of different elements used in IOS memory management can serve as cues. Examples include the bit patterns of specific pointers such as the address values associated with malloc ( ) function calls used to allocate specific blocks of memory, the variation of address values (e.g., offset, range) of the various memory blocks, and other blocks from other OS memory data structures (e.g., a "chunk" which is a memory block which organizes its own elements for fast and small memory requests). Still other elements used in IOS memory can serve to measure the level of recall. One example in IOS is the correlation of a block in use with the cue's value, where, for example, the cue values are stored in a BSS area of memory (as described below). Other IOS memory management elements can serve to measure the level of recognition. For example, the validity of a memory block can be measured against its existence in IOS memory management lists. In general, maximizing the levels of recognition and recall provide higher memory leak detection yields, i.e., less false-positive outcomes. As will be described in greater detail below, both software successive memory tasks analysis and successive memory tests of episodic memory with identical cues or cues containing identification can be used to identify memory leaks. In general, the former technique is used when the number of memory blocks being allocated is relatively small (e.g., on the order of 10,000 in a typical IOS implementation), and thus the analysis time will not be severely impacted. The latter technique can be used when the number of memory blocks being allocated exceeds a user's allowed time threshold.

FIG. 1 is a simplified block diagram of a memory leak detection system. Memory leak detection system (MLDS) 110 typically operates in conjunction with a devices operating system 100, e.g., it utilizes memory management services provided by the OS, but can be integrated into the OS in some implementations. At the heart of MLDS 110 is the MLDS Engine 120. MLDS Engine 120 interfaces with several application programming interfaces (APIs) (MLDS data structure API 150 and MLDS command API 130) as well as with operating system 100. In general, MLDS Engine 110 fulfills a number of task to implement and support various memory leak detection algorithms. For example, MLDS 110 handles requests from command line interface (CLI) parser 140, provides memory leak reports to users, initialized and updates MLDS data structures 160, and performs leak detection in designated memory areas with reduced impact on system operation.

As noted above, the Cisco IOS provides an example of an OS such as OS 100. Such OSs typically provide services and functionality for process scheduling and management, memory management, and CPU and physical memory resource management. Moreover, OS 100 can support device drivers interfacing processes, the OS kernel, and various hardware elements. Because the environment in which OS 100 and MLDS 110 operate typically imposes a variety of resource restrictions, e.g., an embedded or real-time environment, MLDS 110 is preferably designed to minimize the impact on CPU and memory resources. In one embodiment, MLDS 110 is designed to not interfere with the normal operations (e.g., network operations such as packet routing, packet forwarding, etc.) of the device. To accomplish this, MLDS 110 can be configured to follow a number of guidelines such as: yield to the CPU as often as possible; choose a relatively low process priority level at which to operate; reduce CPU expensive tasks; eliminate tasks which bring little value; preempt tasks when the analysis could lead to conclusion, and the like. Moreover, in some embodiments, MLDS 110 has full usage of the kernel memory management information and access privilege of any allocated memory block's contents, normally via kernel functions. If the kernel does not already provide this information, then the tool typically needs to provide the additional functionality to retrieve the block and pointer information.

MLDS data structures 160 can be used to store report information, track information on leaked memory blocks, and track information on other memory related statistics, e.g., allocation statistics. Example data structures include: (1) memory type (enum)—this indicates the memory type under analysis because different memory types (heap memory vs. buffer memory) generally need different handling; (2) dynamic memory information—this data structure holds memory information from the time the MLDS was invoked to the current memory usage information; (3) leaked memory information—this data structure holds information about leaked memory blocks; and (4) memory allocation address—this data structure holds the address of the memory allocated from each instance of an allocation function. Numerous other data structures can be implemented and will generally be understood by those having ordinary skill in the art.

CLI Parser 140 allows a user to issue commands to control the memory leak detection and analysis through, for example, a console connection or a telnet session. Commands implemented via CLI parser 140 and MLDS command API 130 include are designed for activating MLDS 110, monitoring and maintaining MLDS 110, and in some cases debugging MLDS 110. For example, commands can be implemented to enable/restart memory leak detection and clear all previous records, disable memory leak detection, display the previous memory leak report if any, provide additional memory allocation information such as allocation counts for each program counter, and provide on demand analysis of the memory leak with latest memory usage and update MLDS data structures 160. Numerous other commands can be implemented and will generally be understood by those having ordinary skill in the art. Although the system and commands illustrated are generally designed to provide on-demand memory leak analysis via CLI, other types of analysis such as event-triggered analysis and scheduled analysis can also be implemented.

Since the goal of the MLDS is to help users identify memory leaks, it is important for MLDS 110 to be able to provide adequate information about memory leaks (and memory usage in general). To that end, MLDS 110 can be designed to provide a variety of different information depending on configuration and/or the specified type of report. The following is a non-exclusive list of the types of information that can be provided by MLDS 110 in association with its operation: caller program counter—address of the system call that allocated the memory block in question; caller name/ID—the name or identification of the process that owns the memory block; icount—the initial block count when MLDS is enabled (this number typically remains constant until MLDS 110 is reset) from each caller program counter; pcount—the previous block count from the last time that a leak detection command was invoked; Icount—the current block count reported during current MLDS analysis; linearity—a reference number that reflects the history (e.g., variation trend) of allocated block numbers; leaked block—the hexadecimal value of a leaked memory block. Using this or other reported information, a user can determine the source of the memory leak, or at least the function/code line that allocated the memory block that ultimately became a memory leak.

In most instances, memory leaks are detectable after the first invocation of MLDS 110. In other instances, it may be necessary, or desirable to invoke the MLDS multiple times and compare results. Thus, a user might establish certain test conditions for the device/program being tested, run MLDS 110, change or re-establish test conditions, re-run MLDS 110, etc.

The information reported by MLDS 110 depends in large part on the memory-related information accessible to the system. Such memory-related information includes, for example, memory management data from OS 100 and memory-related information stored in each block. In one embodiment, each allocated memory block includes, in addition to a user data area, certain header information about the block itself, related blocks, and the circumstances under which the block was allocated. Such header information can include: the block's address (e.g., a pointer value); the process ID/name of the process that caused the block's allocation; the program counter value corresponding to that allocation function invocation; a pointer to the next block in a chain of allocated blocks; a pointer to a previous block in a chain of allocated blocks; block size information; reference count information, and even de-allocation information. Moreover, upon identifying a leaked block, MLDS 110 can use and display some or all of this information, including the complete contents of the leaked memory block.

In the implementation illustrated, all CLI commands access MLDS engine 120 via MLDS command API 130, so that there is no need to access the MLDS data structures from CLI. In other implementations, API functionality can be eliminated or integrated into MLDS engine 120. However, the use of such APIs generally provides greater flexibility and scalability for the memory leak detection system. Moreover, although the various components of MLDS 110 have been shown as separate entities, some or all of them can be combined in various ways as is well known to those having ordinary skill in the art.

Figure 2:
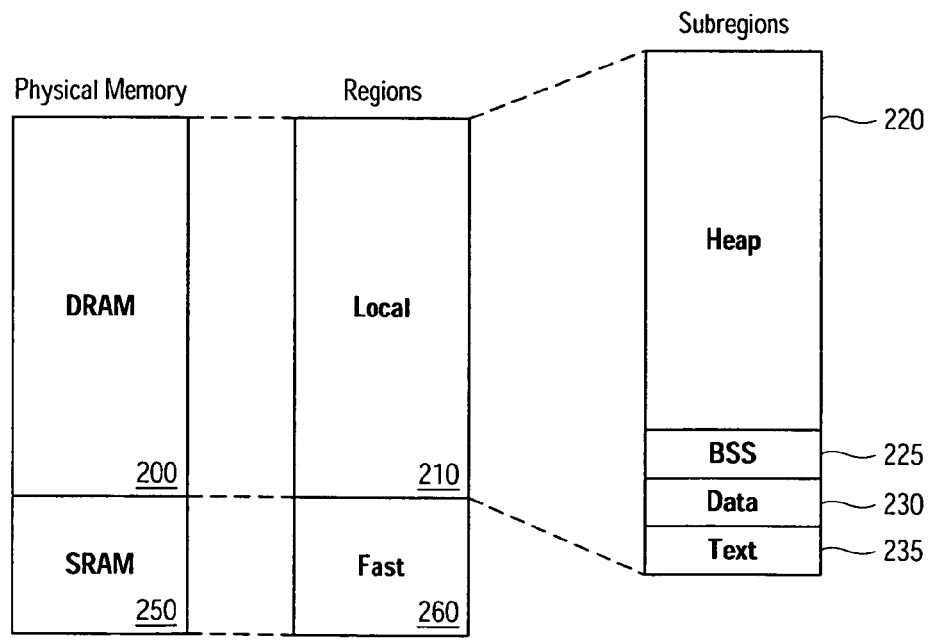
FIG. 2 is a simplified block diagram illustrating an example of memory organization in a device that uses a memory leak detection system.

FIG. 2 is a simplified block diagram illustrating an example of memory organization in a device that uses MLDS 110. Again, the example of FIG. 2 is modeled after an embedded implementation of the Cisco IOS. In this example, the entire physical memory is mapped into one large flat virtual address space. No memory paging of swapping is performed, so this example does not illustrate a full virtual memory scheme. The address space is divided into areas of memory called regions which generally correspond to the various physical memories such as DRAM 200 and SRAM 250. Thus, local region 210 corresponds to DRAM 200 and fast region 260 corresponds to SRAM 250. Different types of physical memory might be present in the system because they are particularly suited for certain tasks. For example, SRAM 250 might be present for storing packets in a router, while DRAM 200 might be present for storing software and operational data. While the local region is typically used for normal run-time data structures and local heaps, other regions can serve more specialized purposes: fast (260)—associated with fast memory such as SRAM 250 and used for special purpose or speed-critical storage; iomem (not shown)—shared memory that is visible to both the CPU and other controllers over a data bus; itext (not shown)—executable OS code; and idata (not shown)—initialized variables; ibss (not shown)—uninitialized variables. Still other regions can be defined.

FIG. 2 also illustrates subregions 220-235. Subregions 220-235 provide a further level of flexibility in organizing and protecting memory. In general, classifying memory into regions and subregions allows the IOS to group various types of memory so software need not know about the specifics of memory on every platform. IOS manages available free memory via a one or more memory pools, which are essentially heaps in the generic sense. Each pool is a collection of memory blocks that can be allocated and deallocated as needed. Memory pools are built from one or more regions or subregions and are managed by memory management functionality of the kernel. In many instances, pools have a one-to-one correspondence with regions or subregions. So, for example, heap 220 can correspond to a single memory pool from which memory blocks are allocated and deallocated. In managing the memory blocks in a pool, the memory manager typically maintains list of available memory blocks. As processes request memory, the memory manager allocates memory from the list. As memory blocks are freed by processes, the area becomes available again and is added back to the list of available blocks. While in many implementations, a single memory manager operates to control all memory related functions for the kernel, in this example there are typically separate memory managers for managing regions/subregions and memory pools. Again, it should be noted that the memory scheme illustrated in FIG. 2 is merely illustrative and a number of different methods for memory organization and management can utilize the memory leak detections systems and methods described in the present application.

Because there are typically several different areas of memory, which may or may not correspond to different types of memory, in a computing system, MLDS 110 is generally designed to search for memory leaks in different memory areas. For example, in one embodiment, MLDS 110 searches for memory leaks in two different IOS memory management areas, the memory managed under the memory pool manager and a buffer area (used for storing data packets handled by routers, etc.) under a buffer manager. Although the discussion of memory leak detection below will generally focus on analyzing the memory in the heap under the memory pool manager, it should be understood that the techniques described can be extended to other types of memory and/or other regions/subregions/pools of memory.

Figure 3:
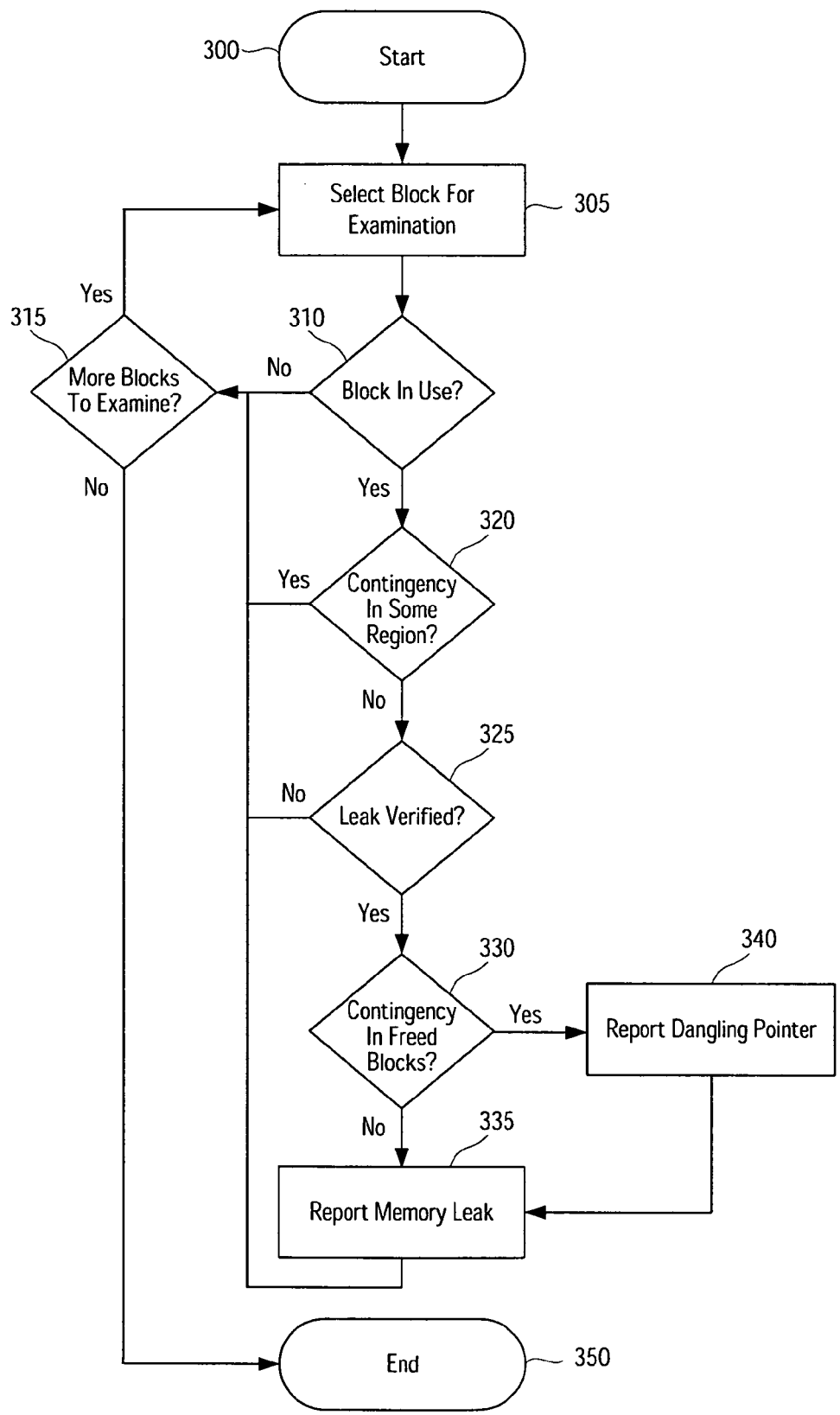
FIG. 3 is a flow chart illustrating techniques of the present invention.
Figure 4:
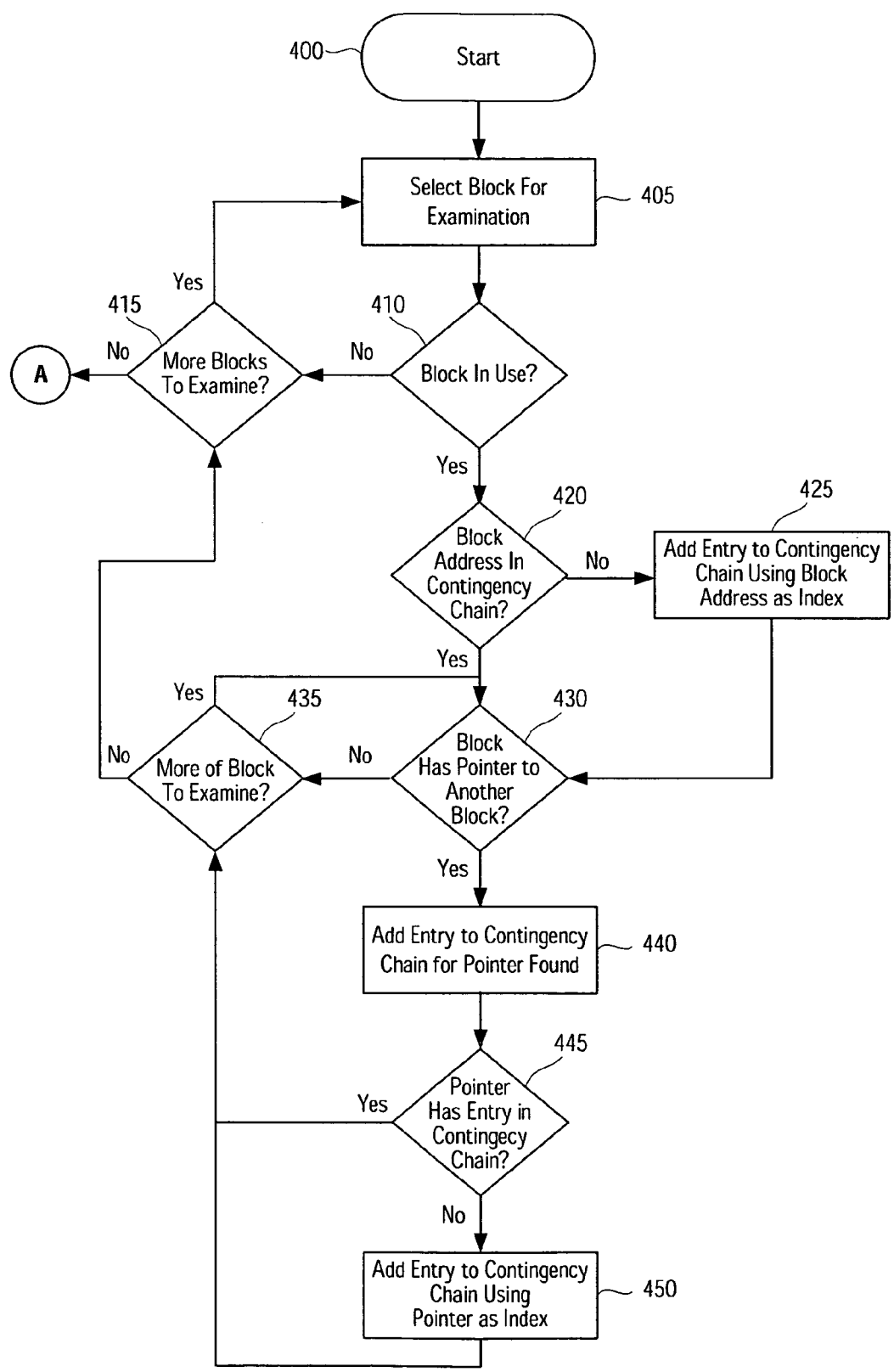
FIG. 4 is a flow chart illustrating techniques of the present invention.
Figure 5:
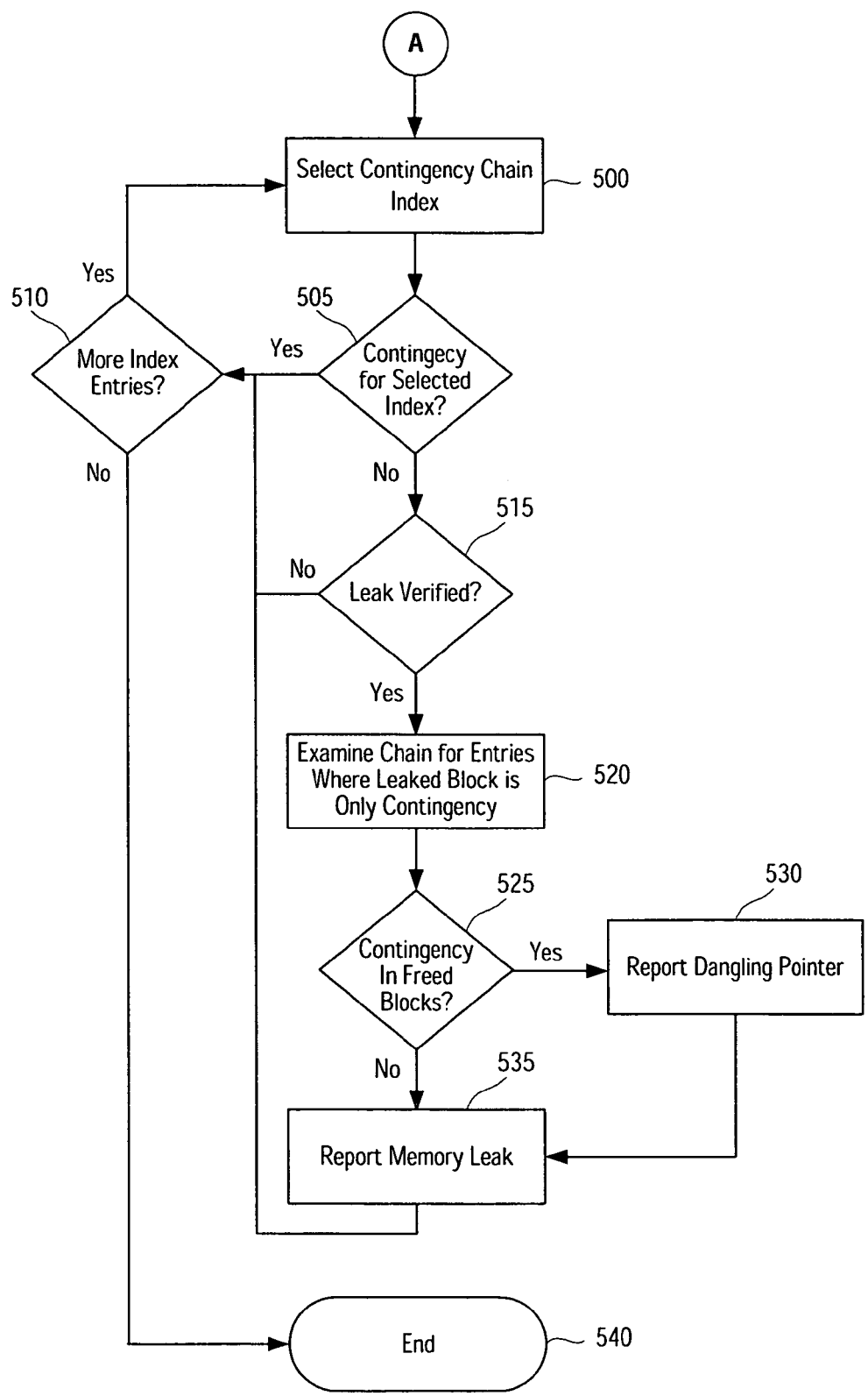
FIG. 5 is a flow chart illustrating techniques of the present invention.

FIGS. 3-5 are flow charts illustrating various memory leak detection techniques that are used by memory leak detection systems such as MLDS 110. In general, a memory leak (leakage) remains unclaimed and unchanged, i.e. the allocated memory is not released, by any other processes or system activities after the parent process terminates or configuration changes regardless of time and system conditions. The leakage occurs during memory dynamic operations, but from the kernel's memory management point of view, the leaked block is no different from other normal memory blocks in use. In order to detect memory leaks, the algorithms described below generally assume that: a leak is always a leak, i.e. it cannot be freed by any process at any time; no process is using a leaked block; and from the system point of view, a leaked block is still valid. Thus, even though the memory usage is volatile in an active system, the leaked memory blocks will remain in the leaked state from, for example, the time when one or more references to the block become lost. From the above assumptions, snapshots of a system's memory map would be considered as containing full status information for all leaked blocks contained in the system, so the following algorithms can apply to scan such a memory snapshot.

All allocated memory should be referenced from memory regions in certain forms. If there is no reference to an allocated memory, that block is most likely leaked, however this may not always be the case as discussed below. Logically, the concept can be extrapolated so that valid memory blocks should be successive from a few basic points in the format of referencing chains. Since the chains are built based on the successive memory reference, they can be referred to as a contingency chain, i.e., in keeping with the application of contingency analysis to memory leak detection. None of the allocated memory should be out of the chains, otherwise there is a memory leak. Similarly, if several blocks were chained together via a referencing pointer, but the whole chain is not addressable from any other pointers or some root pointer, such memory blocks should also be considered leaks. Two basic methods for constructing contingency chains are: (1) Memory scan/search (FIG. 3). Each valid memory region (e.g. heap) should be searched to implicitly form the contingency chain. In general, this implementation could be slow, but it is less complicated and consumes less memory. (2) Explicitly build the chains (FIGS. 4-5). Variations and combinations of these basic techniques will be known by those having ordinary skill in the art.

Whichever technique is utilized, there are several contingency chains to be built (either implicitly or explicitly) before proceeding to the memory leak identification. These chains are generally different from kernel memory management information lists, and will be used to compare to the kernel memory management information lists in order to detect and verify memory leaks. Thus, in the comparison of the contingency chains with the memory management information lists, if a block is valid in the memory management information while not in the contingency chains, it is considered as a candidate leaked block. Due to the volatility of memory usage, a revalidation is desired for confirming a potential leak and reducing the chances of falsely identifying a memory leak.

FIG. 3 is a flow chart illustrating one technique for memory leak detection. In this example, an "implicit" contingency chain is analyzed, i.e., the "building" of this contingency chain leverages the records maintained by OS memory management to determine whether a valid block in the memory pool is being referenced in any possible memory regions. No explicit contingency chain is built and no such record is kept in memory after the analysis is completed, with the idea that the contingency is a digestion of the memory usage from memory map thus memory map itself can also be used directly. This technique is useful where there is small number, e.g., in the range of thousands, of elements. This approach however can be slow if there are high numbers of elements, for example ten thousand or more allocated memory blocks. Using some relevant cues to examine allocated memory, e.g., a pointer containing the address of an allocated memory block, the cue (or pattern) recall is said to be positive when the pointer is found in memory regions and thus there is no memory leak for that block. However, when cue recall is negative, then a memory leak is possible and further validation should be performed. A part of the validation can be to check again whether the same pointer is still in the OS memory management list. If the pointer is still in the OS management list, i.e., cue recognition is positive, when cue recall is negative, then the memory block is indeed a memory leak. On the other hand, if the OS management list has no record of the pointer, i.e. cue recognition is negative when cue recall is also negative, then there is no memory leak.

In one embodiment, such memory analysis is implemented as follows. Operation begins at 300 and typically focuses on analyzing a single memory pool. However, if there are multiple pools or regions to be analyzed, the process illustrated in FIG. 3 can be repeated for each one as desired. In step 305 a particular memory block among those in the memory pool is selected as the target of examination. In one embodiment, memory block selection uses the OS's memory management information, e.g., a list of allocated blocks as seen by the kernel. In still another embodiment, block selection is performed by traversing the memory pool regardless of kernel memory management information. Next, it is determined whether the block is currently in use (310). In some implementations, the determination may have already been made by virtue of the manner in which the target block was selected, e.g., if the target block was selected from a memory management list, then it might be assumed that the OS believes the memory block to be allocated. In another example, the target block (or a corresponding memory data structure) can be examined directly, e.g., looking for a non-zero reference count, to determine if the memory block is allocated. If the target memory block is not allocated, operation transitions to 315 where it is determined whether there are additional blocks in the memory pool to examine. If so, operation returns to 305 where another target block is selected for examination. If not, all memory blocks in the pool have been examined and the process terminates at 350.

If the target memory block is in use as determined at 310, operation transitions to 320 where a determination is made if a contingency exists in some memory pool/region. In many implementations, a block allocated in one memory pool or region will not be referenced by an object outside that pool or region. However, this need not be the case, so the analysis performed in step 320 can include examination of various different memory pools or regions. For example, while some implementations might only search the heap subregion 220 as illustrated in FIG. 2, other implementations can also allow examination of uninitialized variable region 225, and initialized variable region 230. Search for the contingency can take a variety of forms. For example, the pointer to the target block can be used to check the application memory space to confirm the existence, e.g., reference by another object, of the pointer under investigation. This process might require the examination of the entire relevant memory space, or it may simply include the examination of certain portions of the memory space such as the header portions of all allocated memory blocks. Some operating systems may not have a well distinguished application memory space, and so all regions accessible by the application should be examined. In the examination process, the "cue" used is typically a bit pattern representing some or all of the target block's address. In some embodiments, care may need to be taken to distinguish data containing the cue from actual references to the target block, because such errors can lead to false-positive results. Thus, for example, only block user data (and not block headers) might be searched. If there exists a valid reference to the target block somewhere in the target memory space, then a contingency exists and operation transitions to 315 as described above. Any block for which no record can be found of its pointer's existence is a candidate memory leak.

The candidate memory leak is then verified (325). Verification is particularly important in systems where memory is routinely allocated and deallocated. Due to the dynamic nature of the OS at run time, the target memory block may just have been freed during the analysis for contingency, and therefore revalidation is implemented to check whether the block is really freed. If the block is no longer in the OS memory management list then it has been freed. This verification test can be performed in a number of different ways, and may itself include multiple tests. For example, a free block list can be examined to see if the target block is no available on that list. Tests such as those performed in 310 can be used to determine if the target memory block is still allocated. Still other tests might be used, such as deeper examination of certain memory block fields, e.g., caller PC, pointers to related blocks, etc. For example, multiple fields or pieces of information can be examined. So if the block being verified has the same caller PC, the same block address, and a non-zero reference count, then the block has been verified. Although not typically needed, in one embodiment step 325 is purposely delayed for a certain time period to help ensure that any pending deallocation operations are complete. In general, a variety of different verification steps can be performed. If the memory leak is not verified, operation transitions to 315 as described above. If the memory leak is confirmed, then it can be reported directly, e.g., step 335, or additional tests to provide further information about the leak can be performed.

For example, in 330 deallocated memory blocks are examined for the target memory block contingency. In general, this can include searching freed memory blocks (in whole or in part) for a reference to the target memory block using the same cue as used earlier in the process. This particular test is performed to try to identify dangling pointers, i.e., pointers pointing to a heap-dynamic block that has been deallocated. If such contingency exists, additional information is reported about the pointer (340). If no contingency exists in the freed blocks or if operation at 340 is complete, the memory leak is reported (335) with whatever level of specificity is desired, selected, or configured into the memory leak detection tool. The process then returns to 315 to handle the next target memory block. Note that in some cases, memory leak information is "reported" in the sense that the information is stored in an appropriate data structure, e.g., MLDS data structures 160, and only presented to the user at the conclusion of the analysis for the appropriate memory region(s)/pool(s).

As noted above, the process illustrated in FIG. 3 may be repeated for a number of different regions, subregions, or memory pools. Additionally, the process can be designed to target different types of memory objects, e.g., conventional heap memory blocks, packets, packet headers, buffers, etc. Such variations can be incorporated, for example, into steps such as 320 just as that step can include examination of all "visible" memory regions.

A second approach, where an explicit contingency chain is constructed, is illustrated in FIGS. 4 and 5. In general, a contingency chain is built while checking whether the content of a valid memory block in the memory pool has pointers to any valid memory blocks in the memory management list. If there are pointers, the chain is updated. The second approach is generally more complicated, but it is useful as a complement of the first method when many memory blocks are allocated and thus there are potentially more false-positive or false-negative memory leaks and increased analysis time.

Operation begins at 400 and typically focuses on analyzing a single memory pool. However, if there are multiple pools or regions to be analyzed, the process illustrated in FIGS. 4 and 5 can be repeated for each one as desired. In step 405 a particular memory block among those in the memory pool is selected as the target of examination. In one embodiment, memory block selection uses the OS's memory management information, e.g., a list of allocated blocks as seen by the kernel. In still another embodiment, block selection is performed by traversing the memory pool regardless of kernel memory management information. Next, it is determined whether the block is currently in use (410). In some implementations, the determination may have already been made by virtue of the manner in which the target block was selected, e.g., if the target block was selected from a memory management list, then it might be assumed that the OS believes the memory block to be allocated. In another example, the target block (or a corresponding memory data structure) can be examined directly, e.g., looking for a non-zero reference count, to determine if the memory block is allocated. If the target memory block is not allocated, operation transitions to 415 where it is determined whether there are additional blocks in the memory pool to examine. If so, operation returns to 405 where another target block is selected for examination. If not, all memory blocks in the pool have been examined, the contingency chains have been constructed, and the process transitions to FIG. 5 (as described below) where analysis of the contingency chains is performed.

If the target memory block is in use as determined at 410, operation transitions to 420 where a determination is made if there is a contingency chain for the target block, e.g., indexed by the target block address. If not, an entry is added to the contingency chain using the target blocks address as an index value (425). Upon completion of step 425, or if there already exists an entry for the target memory block, operation transitions to 430. Here the target memory block is analyzed for any references to other memory blocks (generally not including itself, but in some implementations such references can be tracked or accommodated). For example, every byte, or multiple bytes as appropriate based on the platform, in the current block is compared to the known pointers of valid memory blocks in the memory management list. Such pointers can be retained in a separate data structure, cache, or simply accessed as needed. If some location in the target block has the cue bit pattern of the pointer of a valid block, the current memory block is said to have the contingency of that block, i.e., recall has been confirmed, and operation transitions to 440. Note that there are a number of different techniques that can be used for analyzing the target memory block. For example, it may only be necessary to analyze a header portion of the memory block if such information is stored in header area of a memory block. Similarly, addresses to other valid memory blocks may be constructed such that identifying them requires searching only for portions of the address. Those having ordinary skill in the art will recognize a variety of different techniques for making the determination of step 420.

If another pointer is not found, as determined in 430, operation transfers to 435. If there are additional portions of the block to examine, operation returns to 430, otherwise operation returns to 415 as described above. In step 440, an entry is added to the contingency chain for the memory block corresponding to the pointer found. Using FIG. 6B as an example, when the search of memory block 0xABCD yields a reference to another memory block, e.g., block 0x1234, then an entry is added "0xABCD" to the contingency chain for block 0x1234. As noted above, care may need to be taken to distinguish data containing cues from actual references to valid memory blocks, because such errors can lead to false-positive results.

If the found pointer does not have its own entry in the contingency chain as determined at 445, such an entry is created explicitly in 450, typically using the pointer value as an index value. If such an entry already exists, operation returns to 435 as described above.

The process thus continues so that all allocated block on the memory management list are examined. If it is necessary to examine other regions, subregions, or pools to complete construction of the contingency chains, then such additions to the process, e.g., looping through all relevant memory regions such as BSS, data, etc., can be performed. Any contingency will also be added to the contingency records if any block with the address is found. Examining all relevant memory regions is useful for increasing the likelihood of successful recall and recognition. In still other examples, different contingency chains are constructed for different memory regions, subregions, or pools.

Once the process of constructing the contingency chains is complete, the contingency chains are analyzed. This is illustrated in FIG. 5. If any record has empty content, i.e. no contingency, that record corresponds to a suspected memory leak. A verification is performed to check whether the relevant memory block has subsequently been freed or is in the process of being freed. If the block is still valid, then recognition is confirmed and the block is reported as a memory leak. If a record has some contents then it is a candidate for recall. However, extra effort should be used to verify whether the content in the record points to another record which may finally point back to the record itself, and to verify whether the content is a dangling reference. If it is confirmed that a loop exists, then it is a variance of the memory leak and again recognition has been reached.

Thus, in step 500, a particular index of the contingency chain is selected. If it is determined in 505 that there are one or more contingencies corresponding the record, e.g., see index 0×1234, 0×5678, 0xBCDE, and 0x89AB, then the assumption is that the memory block corresponding to the index value is not a leak, and operation transitions to 510. As will be seen below, this assumption might not be correct. If there are additional uninspected index entries, as determined in 510, then operation returns to 500. If there are no more entries, then operation terminates 540.

If there is no contingency for the selected index value, e.g., see index 0xABCD, then the corresponding memory block is a suspected leak, and verification is required in 515. Verification is particularly important in systems where memory is routinely allocated and deallocated. Due to the dynamic nature of the OS at run time, the target memory block may just have been freed during the analysis for contingency, and therefore revalidation is implemented to check whether the block is really freed. If the block is no longer in the OS memory management list then it has been freed. This verification test can be performed in a number of different ways, and may itself include multiple tests. For example, a free block list can be examined to see if the target block is no available on that list. Tests such as those performed in 410 can be used to determine if the target memory block is still allocated. Still other tests might be used, such as deeper examination of certain memory block fields, e.g., caller PC, pointers to related blocks, etc. Although not typically needed, in one embodiment step 515 is purposely delayed for a certain time period to help ensure that any pending deallocation operations are complete. In general, a variety of different verification steps can be performed. If the memory leak is not verified, operation transitions to 510 as described above. If the memory leak is confirmed, then it can be reported directly, e.g., step 535, or additional tests to provide further information about the leak can be performed.

For example, upon verification of a memory leak in 515, the contingency chain can be re-examined for entries where the newly discovered leaked memory block is the only contingency. The value of such an operation can be seen by reference to FIG. 6B. Once block 0xABCD is identified as a leak, i.e., it has no contingencies and its status as a memory leak has been verified, then it can be seen that any memory blocks used only by block 0xABCD, e.g., 0x5678, also represent memory leaks. This is because a block that is only references by a memory leak block must necessarily be a memory leak itself. Deallocating memory block 0XABCD will leave memory block 0x5678 with no valid references to the block. Consequently, it too should be indicated as a memory leak.

Additional operations, such as 525 and 530 can also be performed. For example, in 525 deallocated memory blocks are examined for the target memory block contingency. In general, this can include searching freed memory blocks (in whole or in part) for a reference to the target memory block using the same cue as used earlier in the process. This particular test is performed to try to identify dangling pointers. If such contingency exists, additional information is reported about the pointer (530). If no contingency exists in the freed blocks or if operation at 530 is complete, the memory leak is reported (535) with whatever level of specificity is desired, selected, or configured into the memory leak detection tool. The process then returns to 510 to handle the next target memory block. Note that in some cases, memory leak information is "reported" in the sense that the information is stored in an appropriate data structure, e.g., MLDS data structures 160, and only presented to the user at the conclusion of the analysis for the appropriate memory region(s)/pool(s). As noted above, the process illustrated in FIGS. 4 and 5 may be repeated for a number of contingency chains.

The flow charts of FIGS. 3-5 and the systems, methods, and techniques described herein illustrate some of the many operational examples of memory leak detection system use disclosed in the present application. Those having ordinary skill in the art will readily recognize that certain steps or operations described or illustrated can be eliminated or taken in an alternate order. Moreover, the methods described and modules illustrated are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Figures 6A, 6B:
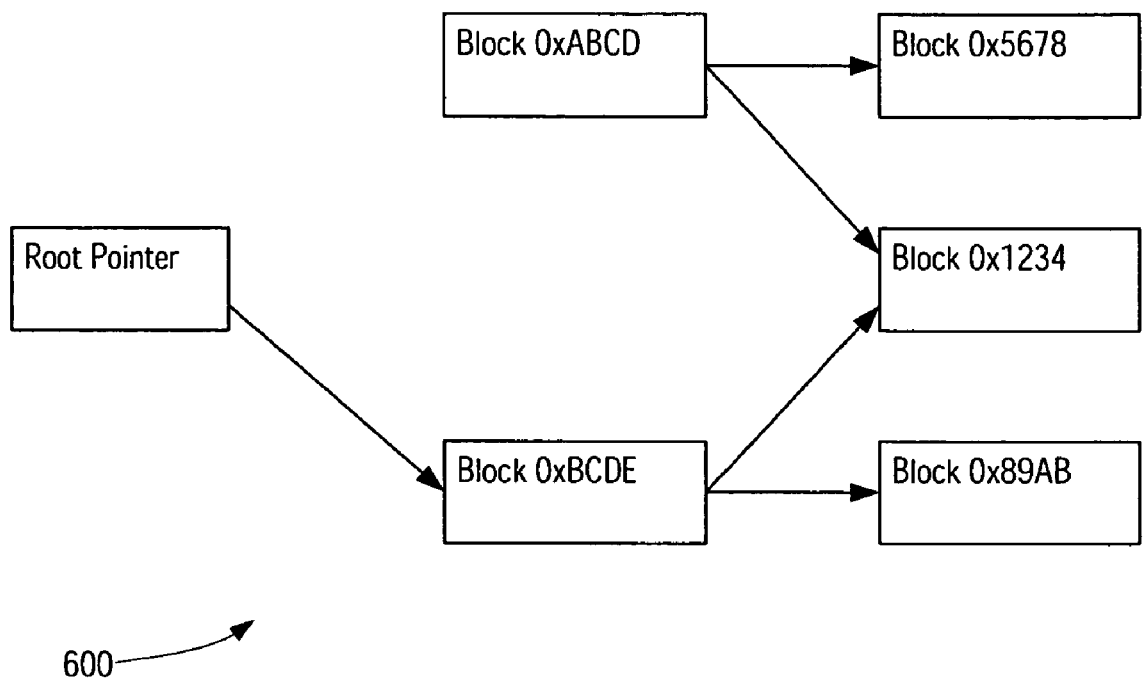
FIGS. 6A and 6B illustrate the simplified relationships among several memory blocks and a corresponding set of contingency information, respectively.

FIGS. 6A and 6B illustrate the simplified relationships among several memory blocks and a corresponding set of contingency information, respectively. FIG. 6B illustrates a contingency chain as constructed by, for example, a process such as that illustrated in FIG. 4. For reference, FIG. 6A illustrates the relationship among the various memory blocks analyzed and reflected in the contingency chain of FIG. 6B. In this example, arrows between memory blocks represent the existence in the "from" block of a pointer referencing the "to" block. Thus, the absence of an arrow pointing to memory block 0xABCD suggests that it, and perhaps any memory blocks referred to only by it, represents a memory leak. The memory organization shown in FIG. 6A is merely illustrative, and those having ordinary skill in the art will recognize that a variety of different memory organization schemes can utilize the memory leak detection systems and techniques described in the present application.

The direct application of Kahana's contingency analysis, along with the use of correlational techniques such as Yule's Q, help to confirm desirable approaches to building memory leak detection tools that provide high memory leakage detection yield. The statistic of successful analysis is generally confirmed by, for example, the Q number. In the process of developing the memory leak detection tools, one can consistently build the contingency table to keep track number of occurrences of recognition (test 1) and recall (test 2) and their relationship to get the values for A, B, C, D. From those values, a Q value can be calculated as described above. The higher the Q value, the lower the noise level generated by the memory leak detection tool. Using the Q value as a reference, memory leak detection tool parameters can be adjusted to increase the likelihood of definite memory leak detection.

Although the examples above have generally emphasized embedded system applications, e.g., the operation of IOS on a network device, these same systems, methods, techniques, and software can be used in a variety of different computing systems.

Figure 7:
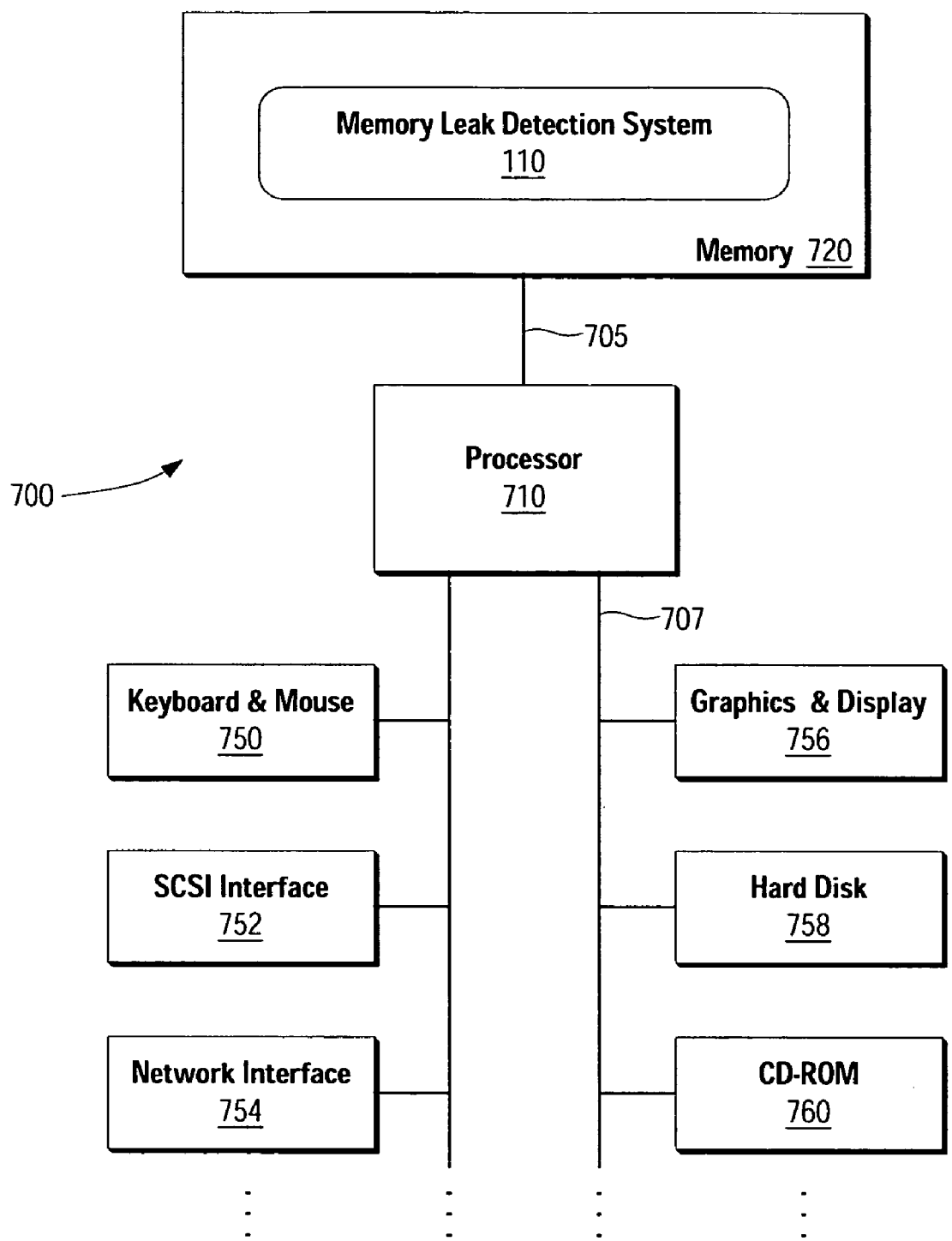
FIG. 7 is a block diagram of a computer system for implementing the techniques of the present invention.

For example, FIG. 7 illustrates a block diagram of a computer system 700 for implementing the memory leak detection techniques of the present invention. For example, computer system 700 can be an embodiment of one of the previously described hosts. Computer system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., MLDS 110. Memory 720 is also used for storing temporary variables or other intermediate information during the execution of instructions by the processor 710.

Those having ordinary skill in the art will readily recognize that the techniques and methods discussed below can be implemented in software using a variety of computer languages, including, for example, traditional computer languages such as assembly language, Pascal, and C; object oriented languages such as C++, C#, and Java; and scripting languages such as Perl and Tcl/Tk. Additionally, software 230 and 262 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard & mouse 750, SCSI interface 752, network interface 754, graphics & display 756, hard disk 458, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
   selecting a first allocated memory block from a plurality of allocated memory blocks, wherein the first allocated memory block includes a first allocated memory block address;
   searching other allocated memory blocks of the plurality of allocated memory blocks for a reference to the first allocated memory block;
   identifying that the first allocated memory block is a suspected memory leak when the reference to the first allocated memory block is not found in the other allocated memory blocks of the plurality of allocated memory blocks;
   verifying that the first allocated memory block is a memory leak in response to the first allocated memory block being identified as the suspected memory leak; and
   reporting the first allocated memory block as the memory leak when the verifying confirms that the first allocated memory block is the memory leak.

2. The method of claim 1 wherein the selecting the first allocated memory block from the plurality of allocated memory blocks further comprises:
   selecting the first allocated memory block address from operating system memory management information.

3. The method of claim 1 wherein each of the plurality of allocated memory blocks includes a header portion, and wherein the searching other allocated memory blocks of the plurality of allocated memory blocks further comprises:
   searching the header portions of the other allocated memory blocks of the plurality of allocated memory blocks for the reference to the first allocated memory block.

4. The method of claim 1 wherein the searching other allocated memory blocks of the plurality of allocated memory blocks further comprises:
   searching for an occurrence of the first allocated memory block address in the other allocated memory blocks of the plurality of allocated memory blocks.

5. The method of claim 1 further comprising:
   examining a reference counter corresponding to the first allocated memory block.

6. The method of claim 1 wherein the verifying that the first allocated memory block is a memory leak further comprises:
   determining whether the first allocated memory block has been deallocated.

7. The method of claim 1 wherein the first allocated memory block includes a header portion, and wherein the verifying that the first allocated memory block is a memory leak further comprises:
   examining the header portion of the first allocated memory block.

8. The method of claim 1 wherein the verifying that the first allocated memory block is a memory leak further comprises:
   examining free block memory management information maintained by an operating system.

9. The method of claim 1 wherein the reporting the first allocated memory block as the memory leak further comprises:
   displaying to a user at least one of: a program counter value, a process identification value, a process name, an initial block count, a previous block count, a current block count, a linearity value, the first allocated memory block address, and contents of the first allocated memory block.

10. The method of claim 1 wherein the reporting the first allocated memory block as a memory leak further comprises:
    storing in a data structure at least one of: a program counter value, a process identification value, a process name, an initial block count, a previous block count, a current block count, a linearity value, the first allocated memory block address, and contents of the first allocated memory block.

11. The method of claim 1 further comprising:
    searching the first allocated memory block for a reference to at least one of the plurality of allocated memory blocks; and
    storing the first allocated memory block address in a contingency chain corresponding to the at least one of the plurality of allocated memory blocks when a reference to the at least one of the plurality of allocated memory blocks is found in the first allocated memory block.

12. The method of claim 1 further comprising:
    examining a contingency chain corresponding to one of the plurality of allocated memory blocks to determine whether any of the plurality of allocated memory blocks references the one of the plurality of allocated memory blocks.

13. The method of claim 1 further comprising:
    forming a contingency chain for each of the plurality of allocated memory blocks, wherein each contingency chain is indexed by an allocated memory block address of the corresponding each of the plurality of allocated memory blocks.

14. A system comprising:
    a memory;
    a processor coupled to the memory; and
    a memory leak detection system (MLDS) engine, wherein at least a portion of the MLDS engine is encoded as instructions stored in the memory and executable on the processor, and wherein the MLDS engine is configured to:
    select a first allocated memory block from a plurality of allocated memory blocks stored in the memory, wherein the first allocated memory block includes a first allocated memory block address;
    search other allocated memory blocks of the plurality of allocated memory blocks for a reference to the first allocated memory block;
    identify that the first allocated memory block is a suspected memory leak when the reference to the first allocated memory block is not found in the other allocated memory blocks of the plurality of allocated memory blocks;

verify that the first allocated memory block is a memory leak in response to the first allocated memory block being identified as the suspected memory leak; and report the first allocated memory block as the memory leak when the verifying confirms that the first allocated memory block is the memory leak.

15. The system of claim 14 further comprising at least one of an MLDS data structure application programming interface (API), an MLDS command API, an MLDS data structure, and a command line interface (CLI) parser stored in at least one of the memory and a storage device accessible by the processor.

16. The system of claim 14 wherein the MLDS engine is further configured to:

select the first allocated memory block address from operating system memory management information.

17. The system of claim 14 wherein each of the plurality of allocated memory blocks includes a header portion, and wherein the MLDS engine is further configured to:

search the header portions of the other allocated memory blocks of the plurality of allocated memory blocks for the reference to the first allocated memory block.

18. The system of claim 14 wherein the MLDS engine is further configured to:

search for an occurrence of the first allocated memory block address in the other allocated memory blocks of the plurality of allocated memory blocks.

19. The system of claim 14 wherein the MLDS engine is further configured to:

examine a reference counter corresponding to the first allocated memory block.

20. The system of claim 14 wherein the MLDS engine is further configured to determine whether the first allocated memory block has been deallocated.

21. The system of claim 14 wherein the first allocated memory block includes a header portion, and wherein the MLDS engine is further configured to:

examine the header portion of the first allocated memory block.

22. The system of claim 14 wherein the MLDS engine is further configured to:

examine free block memory management information maintained by an operating system.

23. The system of claim 14 wherein the MLDS engine is further configured to:

display at least one of: a program counter value, a process identification value, a process name, an initial block count, a previous block count, a current block count, a linearity value, the first allocated memory block address, and contents of the first allocated memory block.

24. The system of claim 14 wherein the MLDS engine is further configured to:

store in a data structure at least one of: a program counter value, a process identification value, a process name, an initial block count, a previous block count, a current block count, a linearity value, the first allocated memory block address, and contents of the first allocated memory block.

25. The system of claim 14 wherein the MLDS engine is further configured to:

search the first allocated memory block for a reference to at least one of the plurality of allocated memory blocks; and store the first allocated memory block address in a contingency chain corresponding to the at least one of the plurality of allocated memory blocks when a reference to the at least one of the plurality of allocated memory blocks is found in the first allocated memory block.

26. The system of claim 14 wherein the MLDS engine is further configured to:

examine a contingency chain corresponding to one of the plurality of allocated memory blocks to determine whether any of the plurality of allocated memory blocks references the one of the plurality of allocated memory blocks.

27. The system of claim 14 wherein the MLDS engine is further configured to:

form a contingency chain for each of the plurality of allocated memory blocks, wherein each contingency chain is indexed by an allocated memory block address of the corresponding each of the plurality of allocated memory blocks.

28. A computer readable storage medium comprising program instructions executable on a processor, wherein the program instructions are operable to implement each of:

selecting a first allocated memory block from a plurality of allocated memory blocks, wherein the first allocated memory block includes a first allocated memory block address;

searching other allocated memory blocks of the plurality of allocated memory blocks for a reference to the first allocated memory block;

verifying identifying that the first allocated memory block is a suspected memory leak when the reference to the first allocated memory block is not found in the other allocated memory blocks of the plurality of allocated memory blocks;

verifying that the first allocated memory block is a memory leak in response to the first allocated memory block being identified as the suspected memory leak; and reporting the first allocated memory block as the memory leak when the verifying confirms that the first allocated memory block is the memory leak.

29. The computer readable storage medium of claim 28 wherein the selecting the first allocated memory block from the plurality of allocated memory blocks further comprises:

selecting the first allocated memory block address from operating system memory management information.

30. The computer readable storage medium of claim 28 wherein each of the plurality of allocated memory blocks includes a header portion, and wherein the searching other allocated memory blocks of the plurality of allocated memory blocks further comprises:

searching the header portions of the other allocated memory blocks of the plurality of allocated memory blocks for the reference to the first allocated memory block.

31. The computer readable storage medium of claim 28 wherein the searching other allocated memory blocks of the plurality of allocated memory blocks further comprises:

searching for an occurrence of the first allocated memory block address in the other allocated memory blocks of the plurality of allocated memory blocks.

32. The computer readable storage medium of claim 28 further comprising program instructions operable to implement:

examining a reference counter corresponding to the first allocated memory block.

33. The computer readable storage medium of claim 28 wherein the verifying that the first allocated memory block is the memory leak further comprises:
  determining whether the first allocated memory block has been deallocated.

34. The computer readable storage medium of claim 28 wherein the first allocated memory block includes a header portion, and wherein the verifying that the first allocated memory block is the memory leak further comprises:
  examining the header portion of the first allocated memory block.

35. The computer readable storage medium of claim 28 wherein the verifying that the first allocated memory block is the memory leak further comprises:
  examining free block memory management information maintained by an operating system.

36. The computer readable storage medium of claim 28 wherein the reporting the first allocated memory block as a memory leak further comprises:
  displaying to a user at least one of: a program counter value, a process identification value, a process name, an initial block count, a previous block count, a current block count, a linearity value, the first allocated memory block address, and contents of the first allocated memory block.

37. The computer readable storage medium of claim 28 wherein the reporting the first allocated memory block as a memory leak further comprises:
  storing in a data structure at least one of: a program counter value, a process identification value, a process name, an initial block count, a previous block count, a current block count, a linearity value, the first allocated memory block address, and contents of the first allocated memory block.

38. The computer readable storage medium of claim 28 further comprising program instructions operable to implement each of:
  searching the first allocated memory block for a reference to at least one of the plurality of allocated memory blocks; and
  storing the first allocated memory block address in a contingency chain corresponding to the at least one of the plurality of allocated memory blocks when a reference to the at least one of the plurality of allocated memory blocks is found in the first allocated memory block.

39. The computer readable storage medium of claim 28 further comprising program instructions operable to implement each of:
  examining a contingency chain corresponding to one of the plurality of allocated memory blocks to determine whether any of the plurality of allocated memory blocks references the one of the plurality of allocated memory blocks.

40. The computer readable storage medium of claim 28 further comprising program instructions operable to implement:
  forming a contingency chain for each of the plurality of allocated memory blocks, wherein each contingency chain is indexed by an allocated memory block address of the corresponding each of the plurality of allocated memory blocks.

41. An apparatus comprising:
  a means for selecting a first allocated memory block from a plurality of allocated memory blocks, wherein the first allocated memory block includes a first allocated memory block address;
  a means for searching other allocated memory blocks of the plurality of allocated memory blocks for a reference to the first allocated memory block;
  a means for identifying that the first allocated memory block is a suspected memory leak when the reference to the first allocated memory block is not found in the other allocated memory blocks of the plurality of allocated memory blocks;
  a means for verifying that the first allocated memory block is a memory leak in response to the first allocated memory block being identified as the suspected memory leak; and
  a means for reporting the first allocated memory block as the memory leak when the verifying confirms that the first allocated memory block is the memory leak.

42. The apparatus of claim 41 wherein each of the plurality of allocated memory blocks includes a header portion, and wherein the apparatus further comprises:
  a means for searching the header portions of the other allocated memory blocks of the plurality of allocated memory blocks for the reference to the first allocated memory block.

43. The apparatus of claim 41 further comprising:
  a means for searching for an occurrence of the first allocated memory block address in the other allocated memory blocks of the plurality of allocated memory blocks.

44. The apparatus of claim 41 further comprising:
  a means for displaying to a user at least one of: a program counter value, a process identification value, a process name, an initial block count, a previous block count, a current block count, a linearity value, the first allocated memory block address, and contents of the first allocated memory block.

45. The apparatus of claim 41 further comprising:
  a means for searching the first allocated memory block for a reference to at least one of the plurality of allocated memory blocks; and
  a means for storing the first allocated memory block address in a contingency chain corresponding to the at least one of the plurality of allocated memory blocks when a reference to the at least one of the plurality of allocated memory blocks is found in the first allocated memory block.

46. The apparatus of claim 41 further comprising:
  a means for examining a contingency chain corresponding to one of the plurality of allocated memory blocks to determine whether any of the plurality of allocated memory blocks references the one of the plurality of allocated memory blocks.

47. The apparatus of claim 41 further comprising:
  a means for forming a contingency chain for each of the plurality of allocated memory blocks, wherein each contingency chain is indexed by an allocated memory block address of the corresponding each of the plurality of allocated memory blocks.

* * * * *